March 22, 1966 W. E. SHOWALTER 3,242,109
PREPARATION OF POLYURETHANE FOAMS CONTAINING A
FORMALDEHYDE-MONTMORILLONITE ADDITION PRODUCT
Filed May 21, 1963
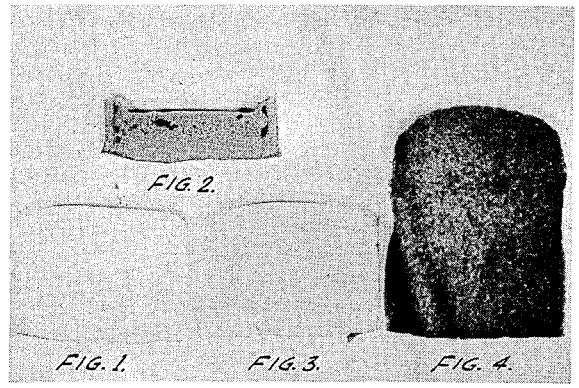
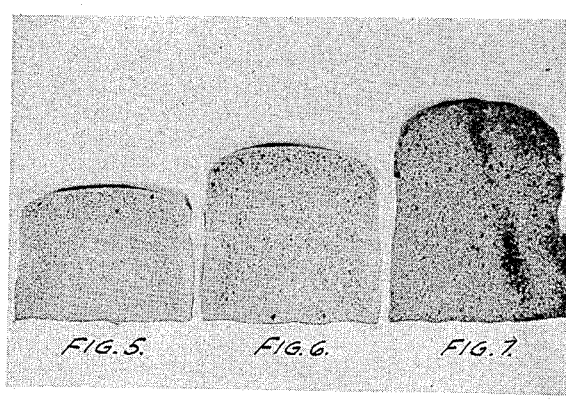
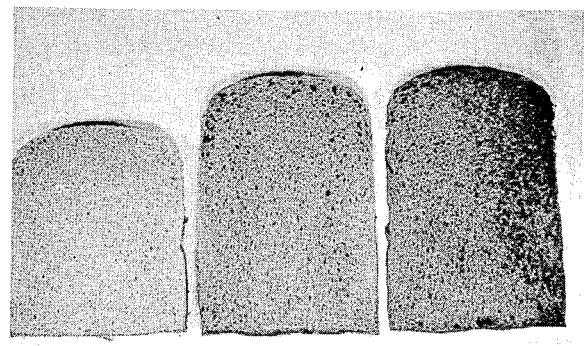
INVENTOR.
WILLIAM E. SHOWALTER
BY
ATTORNEY

United States Patent Office 3,242,109
Patented Mar. 22, 1966

3,242,109
PREPARATION OF POLYURETHANE FOAMS CONTAINING A FORMALDEHYDE - MONTMORILLONITE ADDITION PRODUCT
William E. Showalter, Seal Beach, Calif., assignor to Union Oil Company of California, Los Angeles, Calif., a corporation of California
Filed May 21, 1963, Ser. No. 285,847
4 Claims. (Cl. 260—2.5)

This invention relates to an inorganic filler for incorporating into polyurethane foams and to the polyurethane foams of low densities obtainable therewith.

Foamed or cellular polyurethanes have been prepared with a wide variety of physical properties by reacting a liquid having a reactive hydrogen, e.g., polyester or polyalkylene ether with an organic diisocyanate in the presence of a gas generating reactant and a suitable catalyst. The cost of the raw materials is relatively high, although attempts have been made to substitute relatively inexpensive fatty acid glycerides, e.g., caster oil, tall oil, etc. for the reactive hydrogen liquid and to increase the volume of product by increasing the foaming during reaction.

While these attempts have substantially reduced the cost of urethane foams, it is nevertheless desirable to incorporate inexpensive fillers or extenders into the foams to further reduce the cost of the expensive organic components. Among such materials are the relatively abundant clays and alumino silicates such as the expanding lattice bentonites. Previous investigators have incorporated various materials, e.g., certain organo-montmorillonites, kaolins and organo-kaolins of a specified size range into polyurethane foams and have contended that the presence of the organo-montmorillonites tends to stabilize the foam preparation and that the kaolins of a specified size range serve to extend the foam.

I have also attempted to extend the volume of foam obtained from the polyurethane reaction by the addition of various fillers, e.g., certain prior art suggested organo-montmorillonites, kaolinites, etc. directly to the polyurethane reactants. In all instances, the inorganic solids so added greatly increased the density of the polyurethane foam and did not noticeably increase the volume of foam so produced. Microscopic investigation of the urethane foam products indicated that although very finely divided solids were employed as fillers, these materials did not disperse into the foam but existed as solid agglomerates within the foam.

I have now discovered that the adducts of formaldehyde and bentonite clays are very desirable extenders or fillers for polyurethane foams in that the addition of these materials to the polyurethane foam achieves very low density foams having substantially greater volume than the unfilled foams, i.e., the inorganic solid serves to extend the urethane foam and thereby lower its cost.

In general, the adducts of formaldehyde and clay are simply prepared by exposing the clay to formaldehyde vapors or by mixing paraformaldehyde with a clay and heating the mixture to the depolymerization temperature of the paraformaldehyde. The adduct product so prepared is thereafter ground to a finely divided powder and employed directly in the urethane foam reaction. I have discovered that the adduct behaves markedly different in the urethane foam preparation than either of its components, i.e., clay or paraformaldehyde. This behavior will be described more particularly in reference to the figures of which:

FIGURE 1 is a photograph of a cross-section through an unfilled urethane foam;

FIGURE 2 is a photograph of a cross-section urethane foam similar to that of FIGURE 1 but containing bentonite clay;

FIGURE 3 is a photograph of a cross-section of a urethane foam of the same formula but containing paraformaldehyde as a filler;

FIGURE 4 is a photograph of a cross-section of a foam of the same recipe but containing an adduct of formaldehyde and clay in the same amounts as in FIGURES 2 and 3;

FIGURES 5, 6 and 7 are photographs of cross-sections of the urethane foams containing varied amounts of the formaldehyde bentonite adduct; and FIGURES 8, 9 and 10 are photographs of cross-sections of a similar urethane foam with varied amounts of the formaldehyde-bentonite adduct as a filler.

A glance at the figures quickly reveals that greater volumes of urethane foam can be obtained by the addition of the formaldehyde-clay adduct of my invention. This is illustrated in FIGURES 1, 2, 3 and 4 wherein the same quantities of organic reactants were employed in preparation of each of the polyurethane foam samples, however the adduct, FIGURE 4, shows a greatly increased volume. It is therefore apparent that the formaldehyde-clay filler of my invention substantially extended the volume of foam produced from the same quantity of expensive reactants. The cross-section of FIGURE 2 demonstrates that the addition of the clay alone collapsed the foam. FIGURE 3 reveals that the addition of paraformaldehyde alone did not extend the volume of foam. FIGURES 5 through 7 and FIGURES 8 through 10 also demonstrate that the volume of foam produced can be controlled by the addition of the formaldehyde-bentonite clay adduct thereto. These figures are further described with regard to Example 2.

The inorganic portion of the formaldehyde-solid adduct employed in my invention is a naturally occurring alumino silicate having an expanding lattice and belonging to a group commonly referred to as a montmorillonite group.

This montmorillonite group includes complex clays having 3-layer crystal lattices which swell or expand in solvents. Included in this group are the following: amargosite, beidelite, bentonite, chloropal, erinite, ferro-montmorillonite, hectorite, metabentonite, montmorillonite, nontronite, otaylite, saponite, etc. These clays are commonly found in a mixture of bentonite clays having an average of aluminum oxide content less than about 20 percent. The bentonite clays also have a high base exchange capacity, commonly between about 80 and 150 milliequivalents per 100 grams of air dried clay. These swelling or expanding lattice montmorillonite clays are found in Wyoming, South Dakota, Montana, Utah, Nevada and California.

The aforedescribed montmorillonites are usually found in a form wherein the base exchange sites are occupied with alkali and/or alkaline earth metals such as sodium, potassium, calcium, magnesium, etc. These clays can be base exchanged to prepare montmorillonites that have various other cations at the base exchange sites such as the cations of the metals of Groups I through VIII of the Periodic Table, ammonium and quaternary ammonium organic cations, the latter comprising a group of organophilic montmorillonites.

The clays also contain substantial quantities of water adsorbed on their surface or included within the clay lattice. A substantial quantity of this water can be removed from the solids simply by heating or drying the solid in an oven above about 100° C. at atmospheric or subatmospheric pressures and the clay so dried is hereafter referred to as dehydrated clay, however, it being understood that not all water of the clay is removed by this drying method. In general, the clay in its hydrated or dehydrated form can be employed in my invention to prepare the formaldehyde-montmorillonite adduct of my invention.

As previously mentioned, the formaldehyde-montmorillonite filler of my invention is prepared simply by reacting or condensing formaldehyde vapors onto the aluminum silicate solid. This can be achieved in various ways, the paraformaldehyde solid can be heated to depolymerize and release formaldehyde vapors which are conducted over the montmorillonite clay or, more simply, the paraformaldehyde is intimately admixed with powdered montmorillonite and then heated to depolymerization temperatures. In general, the relative amounts of formaldehyde and montmorillonite can vary between about 0.5 part by weight formaldehyde per 100 parts montmorillonite to about 65 parts by weight formaldehyde per 45 parts montmorillonite. Preferably, between about 1 and about 20 weight percent of the adduct comprises formaldehyde and most preferably, particularly for urethane foam extenders, between about 5 and about 10 percent of the adduct comprises formaldehyde.

The formulation of polyurethane foams is a well established art to which the formaldehyde-montmorillonite extenders of my invention can be directly added. In general, the foam is formed by reacting a reactive hydrogen liquid with an organic diisocyanate in the presence of a reactant which generates a gas and a catalyst to set the polymer and prevent the collapse of the foam. Various surface active agents are also added to stabilize the foam.

The physical properties of the foam product depend largely on the nature of the reactive hydrogen component. As previously mentioned, polyesters, polyalkylene ethers or fatty acid glycerides are commonly used for this reactant. Suitable materials have molecular weights between about 500 and 5000; preferably between about 1000 and 3000. The polyethers are essentially linear with terminal hydroxyl groups. The polyesters employed are prepared with excess glycol and accordingly have low acid numbers and moderate to high hydroxyl numbers. In general, the reactive hydrogen liquids have hydroxyl numbers between about 300 and about 20 and acid numbers (polyesters and fatty acid glycerides) less than about 10. The hydroxyl number is a direct measure of the density of reactive hydrogens and indicates the degree of cross-linking in the product. Generally, rigid foams are highly cross-linked and are prepared from components having hydroxyl numbers between about 180 and about 300. The flexible foams are prepared from components having hydroxyl numbers between about 20 and about 100, while semi-rigid foams are obtained from components having hydroxyl numbers between about 100 and 180.

The polyesters which can be employed in the foam formulation are obtained by the reaction of saturated alkyl or aryl dibasic acids or anhydrides with polyhydric alcohols in the manner well known to the art. Commercially available materials are prepared from adipic, sebacic, maleic, terephthalic, isophthalic acids and ethylene glycol, trimethylolethane, trimethylolpropane, etc.

The polyalkylene ethers useable as the reactive hydrogen liquid are obtained by polymerization of various alkylene oxides, commonly ethylene oxide or propylene oxide. Examples of such materials are mixed polyglycols of ethylene, propylene, polytetramethylene glycol, polypropylene glycol, polyethylene glycol, etc. These materials are commercially available, e.g., a polypropylene glycol; the tetronic and pluronic series of block polymers of ethylene and propylene oxides that are marketed by the Wyandotte Chemical Company, etc.

Fatty acid glycerides can also be used as the reactive hydrogen liquid to yield a low cost foam. Commonly employed glycerides are castor oil, tall oil, soya oil, linseed oil, etc., which are usually admixed with up to equal amounts of low molecular weight polyols to increase the density of cross-linking sites. Among the low molecular weight polyols so used are triisopropanol, hexatols, ethylene glycol, trimethylolethane, and polyhydric derivatives of alkylene diamines, e.g., Quadrol, marketed by Wyandotte Chemical Company, a N,N,N',N'-tetrakis (2 hydroxypropyl)ethylene diamine.

The diisocyanates employed in the urethane foam preparation are, in general, arylene diisocyanates and include the following: 2,4-tolylene diisocyanate, 2,6-tolylene diisocyanate, 3,3'-ditolylene diisocyanate, diphenylmethane-4,4' diisocyanate, 3,3' dimethyldiphenylmethane 4,4'-diisocyanate, m-phenylene diisocyanate, 1,5-naphthalene diisocyanate, 4,4'-sulfonylbis(phenyl isocyanate), 1-chloro-2,4 phenylene diisocyanate, 1,5-tetrahydronaphthalene diisocyanate, etc.

The amount of isocyanate employed in the formulation depends on the number of reactive hydrogens in the polyalkylene ether, polyester or fatty acid glyceride, which as previously mentioned is selected to obtain the desired degree of cross-linking. The amount of isocyanate employed is also determined by the nature of the gas generating agent and the density desired in the foamed product since the use of water as a gas generating agent consumes a stoichiometric amount of isocyanate.

Generally, when water is added to react with the diisocyanate, approximately 1 to about 10 equivalents of isocyanate; preferably between about 2 and about 6; are employed per equivalent of reactive hydrogen in the formulation. Substantially all the diisocyanate in excess of the equivalent amount consumed by the urethane formation is consumed in carbon dioxide formation with water.

In general, between about 1 and about 10 parts by weight of water are used per 100 parts by weight of urethane reactants; preferably this amount is between about 2 to 7 parts per 100 parts. As previously mentioned, diisocyanate in excess of the stoichiometric amount needed for the reactive hydrogen liquid must be used with this technique to react with the water and liberate carbon dioxide; preferably the diisocyanate is also used in a slight excess than the additional amount consumed by reaction with water.

If desired, all or a portion of the water can be replaced with a latent gas generating component, such as the halogenated hydrocarbons, e.g., trichlorofluoromethane, trichlorotrifluoroethane, dichlorodifluoromethane, etc. Generally, these volatile liquids are used in amounts up to 25 weight percent of the urethane reactants, depending on desired foam density and on character of ingredient as well as ambient conditions.

To stabilize the foam, various surface active agents can be used in amounts between about 0.5 and 5.0 weight percent of the reactants. Generally non-ionic surface active agents are used, however, silicone emulsifiers can also be used, particularly with the aforementioned halogenated hydrocarbon blowing agents. Examples of suitable non-ionic surface active agents are ethylene oxide condensates of vegetable oils, alcohols, phenols, organic acids and hydroxy esters. Included in such compounds are castor oil, tall oil, linseed oil condensates of ethylene oxide having 5 to 70 weight percent of oxyethylene units. Alkylphenol polyoxyethylene compounds having one or more alkyl side chains with about 5 to 20 carbons and 5 to 70 weight percent of an oxyethylene chain can be used, e.g., ethylene oxide condensate of lauryl phenol, of 2,4 dihexyl phenol, or heptenyl cresol, of decyl rescorcinol, of decenyl xylenol, etc. Ethylene oxide condensates of fatty acids having about 10 to about 25 carbons and about 5 to 70 weight percent of ethylene oxide units are also useful, e.g., condensates with lauric, stearic, oleic, linoleic, palmitic acids, etc. Ethylene oxide condensates of esterified polyhydric alcohols can also be used such as condensates of sorbitan monostearate, mannitan monolaurate, etc. having 5 to 70 weight percent of ethylene oxide units. The condensates at 5 to 70 weight percent ethylene oxide and fatty amines or amides with about 10 and 25 carbons can also be used such as the condensates of dodecanamide, tridecyl amine, hexadecyl amine, heptadecanamide, etc.

Tertiary amines and/or organic tin compounds can be used as catalysts for the reaction in the manner known to those skilled in the art. Examples of various amine catalysts are: triethylenediamine, N-alkylmorpholines, e.g., N-methylmorpholine, N-ethylmorpholine, N-butylmorpholine, trialkyl amines, e.g., trimethylamine, dibutyl ethylamine, dihexyl decylamine, etc. Examples of suitable tin compounds are tin salts of fatty acids, e.g., stannous octoate, stannous acetate, stannous propionate, stannous stearate, stannous oleate, etc. Dialkyl tin salts can also be used, e.g., dibutyl tin dilaurate, diethyl tin oleate, diisopropyl tin acetate, dihexyl tin stearate, etc. In general, the catalyst is employed in amounts between about 1 and about 12 weight percent of the urethane reactants; preferably in amounts between about 1 and 5 weight percent.

In the practice of my invention, the formaldehyde-montmorillonite adduct is powdered into a finely divided solid which can be incorporated into the urethane foam recipe by intimately dispersing the solid into the reactive-hydrogen liquid or by use of an intermediate volatile organic solvent such as described in my copending application Serial No. 210,234, filed July 16, 1962. As described in that application, the solid filler to be incorporated into the polyurethane foam is dispersed in a volatile organic solvent, preferably methanol, by adding the solid to the solvent with agitation. The resultant suspension is elutriated to reject all coarse particles and save for use all particles finer than about 5 microns. The clarified suspension is then ready for use in the polyurethane formulation by addition to the reactive hydrogen liquid. The resultant mixture is then heated to vaporize the volatile organic solvent and provide a dispersion of the formaldehyde-montmorillonite in the reactive hydrogen liquid. In general, between about 1 and about 35 and preferably between about 10 and 30 weight percent of the foam reactants comprise the formaldehyde-montmorillonite adduct of my invention. As previously mentioned, however, the dried and powdered formaldehyde-montmorillonite can simply be added to the reactive-hydrogen liquid, preferably with stirring and the resultant suspension incorporated into the urethane foam preparation in the manner conventional in the art.

The remainder of the polyurethane preparation follows conventional practice. The one-shot technique is preferred, wherein the blowing agent (water or halogenated hydrocarbon), catalyst and surfactant are added to the reactive hydrogen component and the resultant single blend is subsequently admixed with the organic diisocyanate to form a reacting mass which is discharged into the mold. A modification of this procedure that I have found provides foams having a very uniform texture comprises delaying the addition of water to the reactants for several seconds, about 1 to 20 seconds, after the organic diisocyanate has been added. The reactants are thereafter discharged into the mold.

My invention can also be used in the "prepolymer" technique wherein the diisocyanate is aged with all or a portion of the reactive hydrogen component for several minutes to several hours prior to the addition of the catalyst. In this embodiment, which is preferably used when a fatty acid glyceride is the reactive hydrogen liquid, all or a portion of the reactive hydrogen component comprises the aforedescribed suspension of the formaldehyde-montmorillonite adduct in the reactive-hydrogen liquid reactant.

The following are illustrative of polyurethane formulations of my invention:

FORMULATION 1.—LOW DENSITY SEMI-RIGID

| Component: | Parts by weight |
|---|---|
| Prepolymer [1]— | |
| 2,4-toluene diisocyanate | 100 |
| Castor oil [2] | 150 |
| Water | 5 |
| Diethylcyclohexylamine | 5 |

[1] Prepolymer aged for 30 minutes at 75° C.
[2] A fatty acid glyceride having a hydroxyl number of 160 in which is stably dispersed 50 parts by weight of a formaldehyde-montmorillonite adduct containing 15 weight percent formaldehyde per 100 parts of castor oil.

FORMULATION 2.—LOW DENSITY RIGID

| Component: | Parts by weight |
|---|---|
| 4,4' diphenyl methane diisocyanate | 70 |
| Crude tall oil [1] | 75 |
| N,N,N',N' - tetrakis(2 - hydroxypropyl)ethylenediamine | 25 |
| Dichlorodifluoromethane | 25 |
| Dimethyl polysiloxane | 1 |
| Triethylene diamine | 2 |

[1] A crude mixture of rosin, oleic, linoleic and stearic acids in which is suspended about 15 parts per 100 parts of a formaldehyde-montmorillonite containing about 7 weight percent formaldehyde.

FORMULATION 3.—HIGH DENSITY RIGID

| Component: | Parts by weight |
|---|---|
| Prepolymer [1]— | |
| 2,4-tolylene diisocyanate | 36 |
| Soya oil [2] | 113 |
| Water | 4 |
| Diethylcyclohexylamine | 3 |

[1] Prepolymer aged for 20 minutes at 80° C.
[2] A fatty acid glyceride having a hydroxyl number of 49 in which is suspended 30 parts per 100 parts soya oil of formaldehyde-montmorillonite containing 5 weight percent formaldehyde.

To illustrate the results obtainable by my invention and to contrast such results with various other extenders, the following examples are presented:

*Example 1*

A sample of commercially obtainable montmorillonite, Wyoming bentonite, was divided into two portions and one portion was dried at 100° C. and 29 inches water vacuum for several hours until an "anhydrous" state was achieved. The anhydrous and as-received portions were then admixed with paraformaldehyde and the mixtures where then heated to a sufficient depolymerization temperature for the paraformaldehyde, approximately 300° F., for several hours, then cooled, powdered and screened through an 80 mesh screen. During the heating operation, no appreciable amount of the formaldehyde escaped as vapors from the mixture, which after the heating period was found to be a homogeneous solid wherein the formaldehyde has formed an adduct with the montmorillonite. An analysis of the organoclay after heating revealed that in the case of the "anhydrous" montmorillonite, the solid contained 9 weight percent formaldehyde and with the as-received montmorillonite, the solid contained 5.8 percent formaldehyde.

*Example 2*

A formaldehyde-anhydrous montmorillonite adduct containing about 7 percent formaldehyde was prepared in a similar manner and divided into several portions. Each portion was employed in a series of polyurethane foam recipes in which the amount of filler was varied from about 4 to about 30 weight percent of the total ingredients employed in the urethane foam.

The following urethane foam recipes were employed:

TABLE 1

| Ingredients | Recipe A | Recipe B |
|---|---|---|
| Reactive hydrogen liquid, LHT-67,[1] a polyol | 150 g. | 150 g. |
| Catalyst, dibutyl tin dilaurate | 1.5 | 4.0 |
| Silicone L-520 [2] | 1.5 | 1.5 |
| Water | 3.0 | 4.0 |
| Tolyldene diisocyanate | 49 | 57 |
| Filler, formaldehyde-anhydrous montmorillonite | 10–90 | 30–90 |

[1] Marketed and manufactured by Union Carbide Chemicals Company and identified in their publication Technical Information Bulletin, F-40378A of April 1959 as comprising a straight polyoxpropylene adduct with hexanetriol with an average hydroxyl number of 67.

[2] A polysiloxane-polyoxalkylene block copolymer prepared in accordance with the disclosure in U.S. Patent Number 2,834,748.

The conventional urethane foam preparation was followed wherein the filler was first added to the polyol and thereafter the catalyst, wetting agent and water in the amounts indicated above were added. The mixtures were stirred thoroughly in a high speed mixer and the tolyldene diisocyanate was thereafter added and the mixture stirred for an additional 20 seconds and then poured into standard molds. After 5 minutes at room temperature, the resultant foams were placed in an oven at 150° F. for 4 hours, removed, visually inspected and their densities determined. The following table summarizes the densities of foams so obtained:

TABLE 2

| | Density (lb./ft.³) | |
|---|---|---|
| | Recipe A | Recipe B |
| Amount of Filler, Weight Percent: | | |
| 0 | 3.0 | 2.6 |
| 4 | 2.9 | |
| 8 | 3.0 | |
| 12 | 2.4 (Figure 8) | 2.0 (Figure 5) |
| 15 | 2.5 | 1.9 |
| 18 | 2.2 (Figure 9) | 1.9 |
| 22 | 2.1 | 1.9 (Figure 6) |
| 25 | 2.1 | 1.9 |
| 28 | 2.8 (Figure 10) | 1.9 (Figure 7) |

Representative foams of each series were cross-sectioned and photographed and their photographs appear in FIGURES 5 to 10 as indicated.

When the experiment was repeated with a formaldehyde-montmorillonite, using as-received clay, foams having a similar density and texture were produced; however the foams were darker in color and exhibited a greater shrinkage than those prepared from the "anhydrous" clay.

*Example 3*

Example 2 was repeated with recipe B; however the water was not added to the polyol but instead, the polyol, formaldehyde-montmorillonite filler, catalyst and wetting agent were stirred in the blender and the tolyldene diisocyanate added while stirring. After about 5 seconds the water was added and the stirring continued for about 15 seconds and then the reactants were poured into the molds. After curing, the foams were tested and the properties of the foam so obtained are contrasted in the following table to the properties of foams prepared in Example 2.

TABLE 3

| Example | Filler, Wt., Percent | Density, lbs./cu. ft. | Tensile Strength, p.s.i. | Compressive Stress 50% Deflection, p.s.i. |
|---|---|---|---|---|
| 2 | 12 | 2.0 | 8.0 | 0.9 |
| 3 | 12 | 1.9 | 12.8 | 1.2 |

These data show that an improvement in tensile strength and compressive stress can be achieved by delaying the introduction of water into the reactants until after the diisocyanate has been added. Additionally, the foam prepared in Example 3 had a better cell structure and microscopic observation failed to reveal any clay particles within the foam.

The preceding examples are not intended to limit the scope of the invention but are solely to illustrate a mode of practice and demonstrate some of the results obtainable by practicing the invention. My invention is intended to be defined by the steps of the methods and ingredients of the compositions and equivalents thereof set forth in the following claims.

I claim:

1. In the preparation of cellular polyurethanes wherein a reactive hydrogen liquid having a molecular weight between about 500 and 3,000, a hydroxyl number between about 20 and about 300 and selected from the class consisting of polyalkylene ethers, fatty acid glycerides, polyesters of dibasic acids and dihydric alcohols having acid numbers less than about 10, and mixtures thereof, is reacted with an excess of an arylene diisocyanate in the presence of a gas generating reactant, a catalyst and a surface active agent; the improved method for extending the volume of cellular polyurethane so produced that comprises adding to said reactive hydrogen liquid prior to said reaction with said arylene diisocyanate a formaldehyde-montmorillonite addition product containing between about 1 and about 20 weight percent formaldehyde.

2. The method of claim 1 wherein the amount of said formaldehyde-montmorillonite addition product comprises between about 1 and about 30 weight percent of the total weight of the polyurethane reactants.

3. The method of claim 1 for the preparation of a flexible cellular polyurethane wherein said reactive hydrogen liquid is a polyalkylene ether, said catalyst is a dialkyl tin salt of a fatty acid and said arylene diisocyanate is tolylene diisocyanate.

4. The method of claim 1 wherein said catalyst, said surface active agent and said formaldehyde-montmorillonite addition product are admixed with said reactive hydrogen liquid; said arylene diisocyanate is thereafter added and said gas generating agent is added to the resultant reactants from about 1 to about 20 seconds after said addition of said arylene diisocyanate.

References Cited by the Examiner

UNITED STATES PATENTS

| 2,501,600 | 3/1950 | Feasley | 260—67 |
| 2,634,244 | 4/1953 | Simon et al. | 260—2.5 |
| 3,051,755 | 8/1962 | Schweitzer | 260—606 |

FOREIGN PATENTS 953,561  12/1956  Germany.

LEON J. BERCOVITZ, *Primary Examiner.*